Patented May 7, 1940

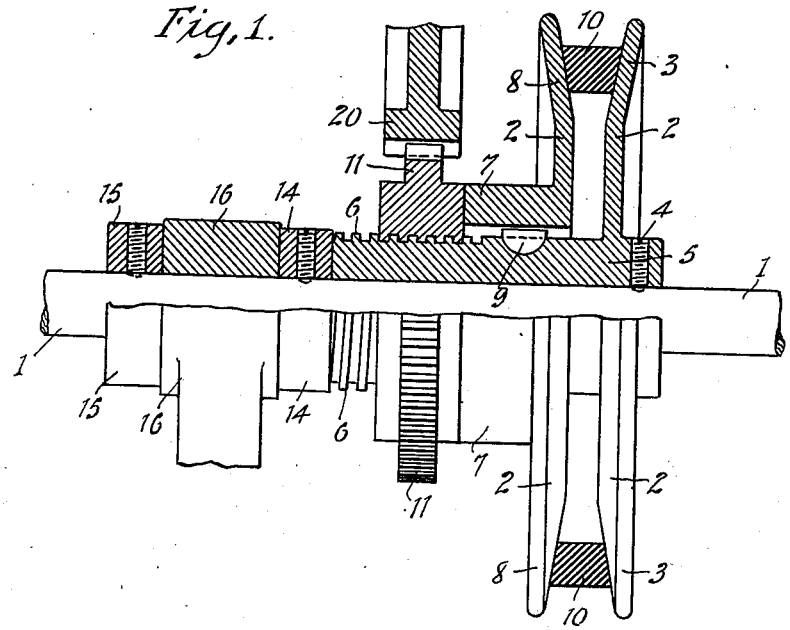
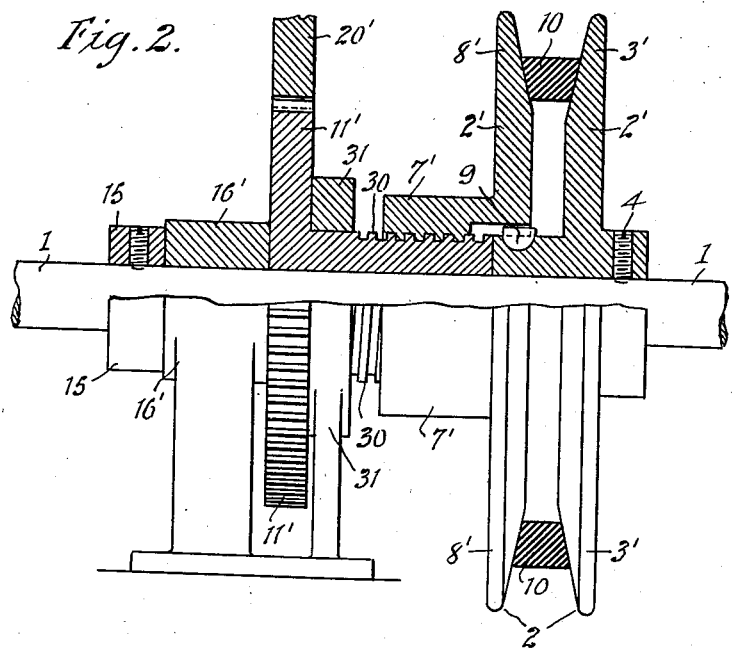

2,199,569

UNITED STATES PATENT OFFICE 2,199,569

BELT DRIVE

Robert V. Morse, Ithaca, N. Y.

Application August 2, 1939, Serial No. 287,986

4 Claims. (Cl. 74—219)

This invention relates to the transmission of power by V belts, with a fixed ratio of rotation between the driving and driven shafts, as has previously been accomplished by chain drives or gears. Ordinary belts, whose contact with the pulleys was merely frictional, have heretofore been considered unsuited to drives where constant speed ratios were required, as any frictional belt has a tendency to creep. The general principle underlying the present invention is the combination of a variable V belt drive which would normally creep, with a parallel regulatory drive of fixed ratio; the V belt drive carrying the heavy load, and the parallel control drive determining the ratio of both but carrying only the light regulatory load,—thus making possible the use of V belts in fields previously monopolized by chains or gears, where the precise transmission of fixed rotative ratios was the determining factor. These basic principles are broadly covered in my copending applications Ser. No. 148,264, filed June 15, 1937, for Power transmission, and the present invention relates to certain improvements thereon, having for their objects simplification of the mechanism, reduction in cost, and improvement in the ease of adjustment and assembly. A further object is to more satisfactorily drive the cam shafts of engines. Various other objects will become apparent as the description proceeds.

Referring now to the drawings forming part of this specification, Fig. 1 is an elevation partly in cross-section showing an improved form of the V belt pulley and regulatory mechanism.

Fig. 2 is a similar view of a modification.

Similar reference numerals refer to similar parts thruout the various views.

Figure 3:
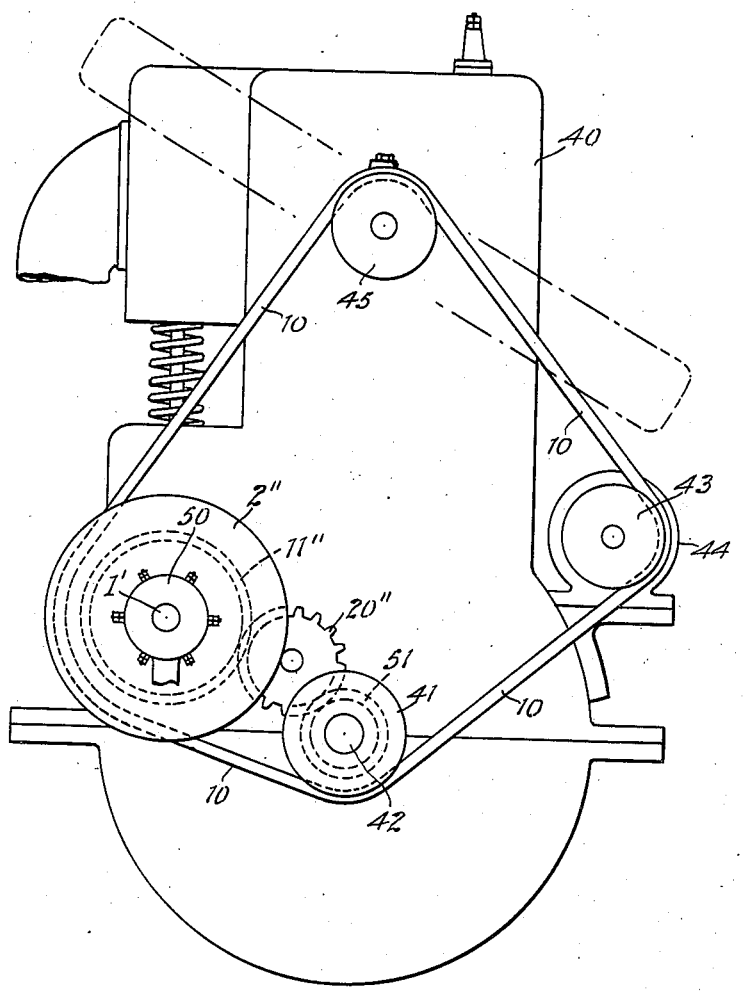
Fig. 3 illustrates by way of example one typical application of such mechanisms to a fixed ratio drive, in this case showing the V belt drive operating the cam shaft, distributor, and other elements of an engine.

Referring now to Fig. 1, the shaft 1 has mounted thereon a variable V belt pulley 2 having a fixed pulley flange 3 secured to the shaft 1 by a set screw 4 or other suitable means. The flange 3 has a long hub 5, the end of which is threaded as at 6. The intermediate portion of the hub 5 is smooth and has slidably mounted thereon the hub 7 carrying the movable V pulley flange 8. A feather key 9 between the hub 5 and the hub 7 compels the two flanges 3 and 8 to rotate in unison but allows the hub 7 and flange 8 to move axially relative to the flange 3, so as to vary the effective diameter of the V belt pulley 2. As the flanges 3 and 8 are drawn together the V belt 10 is caused to ride farther out on the pulley 2, and vice versa. The regulating mechanism for controlling the pitch of the pulley 2 operates thru the gear 11 which has a threaded bore screwing on the thread 6 of the hub 5. When the gear 11 turns in one direction in relation to the thread 6 of the hub 5, it forces the movable flange 8 closer to the fixed flange 3, and increases the effective pitch diameter of the pulley 2. When the gear 11 turns in the opposite direction relative to the hub 5, it is withdrawn from the hub 7 of the movable flange 8, but the wedging pressure of the belt 10 between the flanges of the pulley 2 forces the hub 7 to follow the retreating hub of the gear 11 so as to always maintain contact. The action of the gear 11 turning on the screw 6 thus varies the effective diameter of the pulley 2 in either direction as desired. The collar 14 provides an abutment against which the hub of the gear 11 may lock in case of extreme motion, and together with the collar 15 serves to position the assembly relative to the bearing 16 if desired.

The regulating gear 11 is driven by gearing 20, or by any equivalent positive mechanism such as the chain shown in my copending application above mentioned, the drive to the gear 11 being so proportioned that it will rotate the gear 11 at precisely the rotational speed desired. The pitch of the screw 6 is of such a direction that if the pulley 2 is turning slower than the gear 11 the gear 11 will screw to the left in Fig. 1, followed by the hub 7 and pulley flange 8, separating the flanges 8 and 3, and allowing the belt 10 to sink deeper in the pulley 2 and rotating it at a higher speed. If the pulley speed exceeds that of the gear 11, the reverse action occurs, the relative rotation of the gear 11 on the screw 6 forces the flange 8 closer to the flange 3, and causes the belt 10 to assume a greater effective pitch diameter on the pulley 2, thus slowing down the rotation of the pulley 2. The result is that the pulley seeks and maintains the same rotative speed as the control gear 11.

In the form shown in Fig. 1, the gear 11 travels axially in screwing on the thread 6 of the hub 5, and accordingly it is generally desirable to provide the meshing gear 20 with a wider face than the gear 11, so that it may fully engage at all points in its travel. When the regulating is done with a chain drive this is not necessary, as a chain is flexible enough to allow for the slight lateral motion required.

The mechanism shown in Fig. 2 is in general similar to that shown in Fig. 1, but differs in that the hub 7' of the movable flange 8' is threaded so as to screw directly on a threaded hub 30 of the controlling gear 11', and the pulley flange 3' does not have a threaded hub. In this case the control gear 11' is restrained against axial motion by the fixed collar 31 and the bearing 16', so that the mating gear 20' of the regulating train does not need a wider face. The only lateral motion is in the flange 8' and its hub 7', which travels laterally on the feather key 9 as the screw 30 operates. This varies the effective diameter of the V belt pulley 2', so as to maintain a constant speed ratio in the manner described.

Fig. 3 illustrates the application of such devices to an internal combustion engine for example, where they may be used to drive the cam shaft and also the distributor if desired. The engine is designated by the reference numeral 40 and is shown provided with a four cornered drive in which the V belt 10, driven by the pulley 41 on the crankshaft 42, drives the pulley 43 of the generator 44, also the fan pulley 45, and the regulated variable pitch pulley 2'', similar to the pulleys 2 and 2' above described, which drives the cam shaft 1', on which may also be mounted if desired the distributor 50. The regulating gear 20'', corresponding to the gears 20 and 20' above described, is driven by the gear 51 mounted on the crank shaft 42. It will be noted that by employing a train of three gears, the direction of rotation of the gear 11'', (which corresponds to the gears 11 and 11' above described), is in the same direction as the belt driven pulley 2''. The diameter of the gear 11'' is twice the diameter of the gear 51 in a four cycle engine, to give the two-to-one ratio desired for the cam shaft; and this ratio, being fixed by the regulating gearing, is automatically maintained by the V belt drive in the manner described.

While the gear train 51, 20'', and 11'' normally carries only the light regulatory load, it may be designed if desired of sufficient strength so that if the belt, which carries the main load, happens to break, the gears 51, 20'', 11'' may temporarily drive the cam shaft and permit the car to reach a service station. To prevent the gears from being overstrained under such conditions, the device automatically operates to prevent the full engine power from being used, while still allowing the engine to run at reduced speed. This is accomplished by shifting the valve timing, and if desired the ignition timing, so as to make the engine less efficient. Referring to Fig. 1, it will be noted that if the belt 10 should break the gear 11 would travel on the screw 6 to the left until the hub of the gear 11 locked against the collar 14, after which the parts would rotate as a unit. However, in so doing, the gear 11 would have turned relative to the shaft 1, so that the timing of the cam shaft 1, and distributor 50 if attached thereto, would be thrown off considerably. This amount may be so proportioned that the engine can still run, but very slowly and inefficiently. The driver can thus be made aware of the failure of the belt but not otherwise seriously inconvenienced. An advantage of such a drive is that belts can be readily obtained and quickly installed at almost any gas station, whereas the failure of an ordinary timing chain or gear is a serious matter requiring a major overhaul.

While I have in the foregoing described certain specific examples, it will be understood that they are merely for purposes of illustration to make clear the principles of the invention, which is not limited to the particular forms shown, but is susceptible to various modifications and adaptations in different installations as will be apparent to those skilled in the art, without departing from the scope of the invention as stated in the following claims.

I claim:

1. In a V belt drive, the combination of a shaft, a V belt pulley flange secured thereto, a second V belt pulley flange movable axially relative to the first mentioned flange so as to provide a V belt pulley of variable effective diameter, a V belt on said pulley, a threaded hub on the first mentioned flange, a control wheel mounted on the threaded hub and having a thrust face on the side toward the pulley, the second mentioned flange having a thrust face bearing against the first mentioned thrust face, said thrust faces being held in contact by the wedging pressure of the V belt between the pulley flanges, and means for driving said control wheel at a fixed speed ratio, whereby the V belt drive is maintained in synchronism with the ratio determined by the control wheel drive.

2. In a V belt drive, the combination of a shaft, a V belt pulley flange secured thereto, a second V belt pulley flange movable axially relative to the first mentioned flange so as to provide a V belt pulley of variable effective diameter, a V belt on said pulley, an internally threaded hub on the second mentioned flange, a control wheel mounted for rotation relative to said shaft and having an externally threaded hub mating with the internally threaded hub on the second flange so as to screw the movable flange in either direction to vary the effective diameter of the V belt pulley, thrust bearings for positioning the control wheel, means for driving said control wheel at a fixed speed ratio, whereby the V belt drive is maintained in synchronism with the ratio determined by the control wheel drive.

3. In a V belt drive, the combination of a driving shaft, a driven shaft, a mechanical control drive of fixed ratio between said shafts, a V belt drive capable of variable ratio between said shafts, means for controlling the ratio of the V belt drive to maintain it in synchronism with the mechanical control drive, the main load being carried by the V belt drive and the control drive carrying the regulatory load under normal conditions, and means engaging the control drive to positively carry the main load thru the control drive in the event the V belt drive fails to function.

4. In a cam shaft drive, the combination of a crank shaft, a cam shaft, a V belt drive capable of variable ratio connecting the crank shaft and cam shaft, a mechanical drive of fixed ratio, regulating means controlled by said mechanical drive to maintain the V belt drive at a corresponding fixed ratio, the main cam shaft load being carried by the V belt drive under normal conditions, means for locking the regulatory mechanical drive to the cam shaft in the event the V belt drive fails to function and simultaneously shifting the rotational setting of the cam shaft so as to reduce the load on the cam shaft while it is being driven by said regulatory drive.

ROBERT V. MORSE.